United States Patent [19]

Azuma

[11] Patent Number: 4,719,817
[45] Date of Patent: Jan. 19, 1988

[54] LOCKING DIFFERENTIAL WITH VARIABLE FRICTION TORQUE

[75] Inventor: Hitoshi Azuma, Toyota, Japan

[73] Assignee: Toyota Jidosha Kabushiki Kaisha, Japan

[21] Appl. No.: 934,865

[22] Filed: Nov. 25, 1986

[30] Foreign Application Priority Data

Dec. 7, 1985 [JP] Japan .............................. 60-188699[U]

[51] Int. Cl.[4] ............................................. F16H 1/44
[52] U.S. Cl. ...................................... 74/710.5; 74/711
[58] Field of Search ................................ 74/710.5, 711

[56] References Cited

U.S. PATENT DOCUMENTS

| | | | |
|---|---|---|---|
| 1,243,720 | 10/1917 | Eidson et al. ........................ | 74/710.5 |
| 1,448,670 | 3/1923 | Marcy ................................... | 74/710.5 |
| 2,620,055 | 12/1952 | Fasulo .................................. | 74/710.5 X |
| 4,516,443 | 5/1985 | Hamano et al. .................... | 74/710.5 X |
| 4,526,063 | 7/1985 | Oster ................................... | 74/710.5 |

FOREIGN PATENT DOCUMENTS

| | | | |
|---|---|---|---|
| 1068567 | 11/1959 | Fed. Rep. of Germany ..... | 74/710.5 |
| 60888 | 2/1955 | France ................................. | 74/710.5 |
| 57-130039 | 8/1982 | Japan . | |

*Primary Examiner*—Dirk Wright
*Attorney, Agent, or Firm*—Parkhurst & Oliff

[57] ABSTRACT

There is disclosed herein a locking differential which comprises a differential case, side gears housed in the case to slide along axle shafts, a plurality of thrust washers and guide rings arranged in alternate relation in the case to slide along the axle shafts, a plurality of clutch plates arranged in the ring guides and interposed between the adjacent thrust washers, a resilient member urging the side gears to press the thrust washers and the clutch plates against the inner surfaces of the case while the clutch plates are held in pressure contact with the thrust washers, sleeves arranged axially outwardly of the side gears and having external splines for slidable movment along said axle shafts, the clutch plates each having on its inner periphery splines for engagement with the external splines of the sleeve, and means for moving the sleeves along the axis of the side gears.

15 Claims, 7 Drawing Figures

LOCKING DIFFERENTIAL WITH VARIABLE FRICTION TORQUE

BACKGROUND OF THE INVENTION

1. Field of the Invention

This invention relates to a locking differential for use with motor vehicles, and is more particularly concerned with an improvement in a locking differential wherein friction torque producible by friction disks can easily be varied.

2. Description of the Related Art

A conventional pre-load type locking differential includes a multi-plate clutch having a plurality of friction disks to produce friction torque. A widely used pre-load type locking differential is disclosed in Japanese utility model laid open publication No. Sho 57/130039. The disclosed locking differential includes a differential case within which differential side gears are arranged in confronting relation. A spring assembly for pre-load is interposed between the inner ends of the side gears to enable the multi-plate clutch to produce friction torque.

With reference particularly to FIGS. 4 through 7, a differential case 1 has sleeve portions 1a, 1a, both of which are rotatably mounted on a differential carrier (not shown) by a suitable bearing assembly. As is well known in the art, a ring gear (not shown) is fixedly mounted on the differential case 1. With this arrangement, torque is transmitted through the ring gear to the differential case 1 to rotate the same about the common central axis of the sleeve portions 1a, 1a. Within the differential case 1, a pair of differential side gears 2, 2 mesh with a corresponding pair of pinion gears (or four pinion gears) 3, 3. Right and left axle shafts (not shown) are inserted into the sleeve portions 1a, 1a to join the differential side gears 2, 2, for example, by serration.

The pinion gears 3, 3 are rotatably mounted on the pinion shaft 4, both ends of which are freely journalled in the differential case 1. The pinion shaft 4 has a retainer ring 5 at its center. Interposed between both sides of the retainer ring 5 and the inner ends of the side gears 2, 2 are disks 6, 6 for supporting a spring assembly. One of the disks 6, 6 has an integral sleeve and the other disk has a central shaft. Upon connection of the sleeve and the central shaft of the disks 6, 6, the disks are relatively movable in a lateral direction in FIG. 4, and are rotatable together. One of the disks (left-hand disk in FIG. 4) is rendered nonrotatable relative to the retainer ring 5 under the influence of a pin 15. A large diameter pre-load spring 7 and a small diameter pre-load spring 8 are positioned in the retainer ring 5 to urge the side gears 2, 2 through the disks 6, 6. As a result, the side gears 2, 2 can be moved axially outwardly. As noted above, the differential may include four pinion gears. In this case, a pinion shaft takes the form of a cross.

Multi-plate clutches 9, 9 are interposed between the rear surfaces of the side gears 2, 2 and the inner surfaces of the differential case 1, respectively. As is best seen in FIG. 5, each clutch 9 includes a plurality of friction disks 10 nonrotatable relative to the side gear 2, and a plurality of friction disks 20 nonrotatable relative to the inner surface of the differential case 1. The friction disks 10 and the friction disks 20 are arranged in alternate relation. As shown in FIG. 6, each friction disk 10 has internal splines 11 which engage external splines 17 on a cylindrical portion 16 of the side gear 2. As shown in FIG. 7, each friction disk 20 includes a plurality of projections 21 (arranged circumferentially in a 90° spaced relation) on its outer periphery. These projections 21 are in engagement with grooves 18 on the inner surface of the differential case 1 (see left-hand clutch in FIG. 4). That is, the friction disks 10 and the friction disks 20 are axially slidable (or movable to the right and left in FIG. 4), and are rotatable with the side gears 2, 2 or the differential case 1. A friction surface 12 of each of the friction disks 10 is in pressure contact with a friction surface 22 of the adjacent friction disk 20 under the influence of the pre-load springs 7, 8. As a result, the side gears 2, 2 are subject to frictional resistance by virtue of the multi-plate clutches 9, 9 and differential action is thereby limited.

A wide variety of means have been proposed to vary friction torque, all of which are designed to vary the force necessary to press the friction disks. This force will be 1000 2000 kg. Hydraulic pressure is utilized to produce and vary such large force. However, there is a disadvantage to this hydraulic system in terms of sealing. Further, it requires a large and complicated arrangement.

SUMMARY OF THE INVENTION

It is therefore an object of the present invention to provide an improved locking differential which enables easy and positive adjustment of friction torque.

It is another object of the invention to provide a locking differential which is simple in structure and inexpensive to manufacture.

According to the present invention, there is provided a locking differential which comprises a differential case, side gears housed in the case to slide along axle shafts, a plurality of thrust washers and guide rings arranged in alternate relation in the case to slide along the axle shafts, a plurality of clutch plates arranged in the guide rings and interposed between the adjacent thrust washers, a resilient member urging the side gears to press the thrust washers and the clutch plates against the inner surfaces of the case while the clutch plates are in pressure contact with the thrust washers, sleeves arranged outwardly of the side gears and having external splines for axial movement therealong, each of the clutch plates having on its inner periphery splines for engagement with the external splines of the sleeve, and means for moving the sleeves along the axis of the side gears.

With this arrangement, the sleeves are moved along the axis of the side gears to engage the clutch plates for rotation therewith. This results in the production of friction torque. The friction torque varies depending upon the number of clutch plates engageable with the sleeves. Namely, maximum friction torque is obtained when the sleeves are brought into engagement with all of the clutch plates, whereas no friction torque is obtained when the sleeves are not in engagement with any of the clutch plates.

Other objects and advantages of the present invention will become more clear from a reading of the following detailed description when taken in conjunction with the accompanying drawings.

PREFERRED EMBODIMENT OF THE INVENTION

Figure 1:
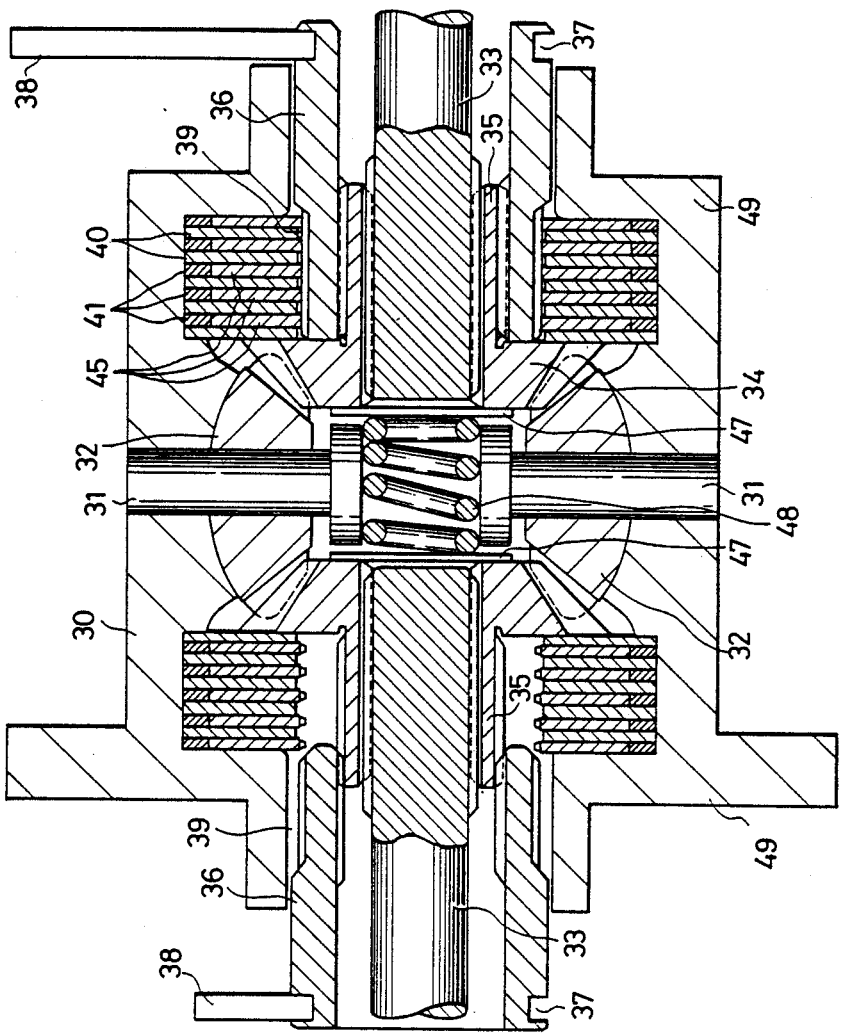
FIG. 1 is a front sectional view of a locking differential according to one embodiment of the present invention.
Figure 2:
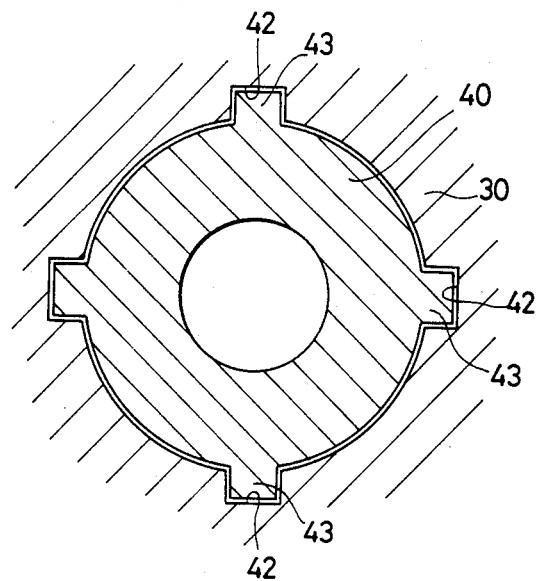
FIG. 2 is a side view of a thrust washer.
Figure 3:
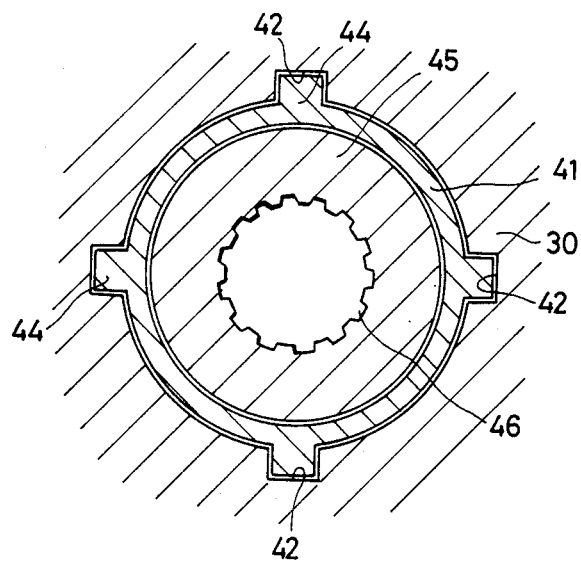
FIG. 3 is a side view of a clutch plate and a guide ring.
Figure 4:
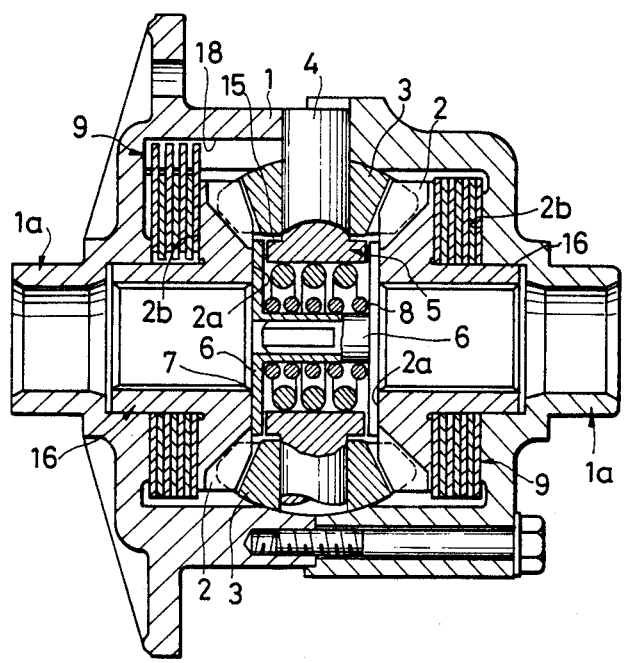
FIG. 4 is a sectional view of a conventional locking differential.
Figure 5:
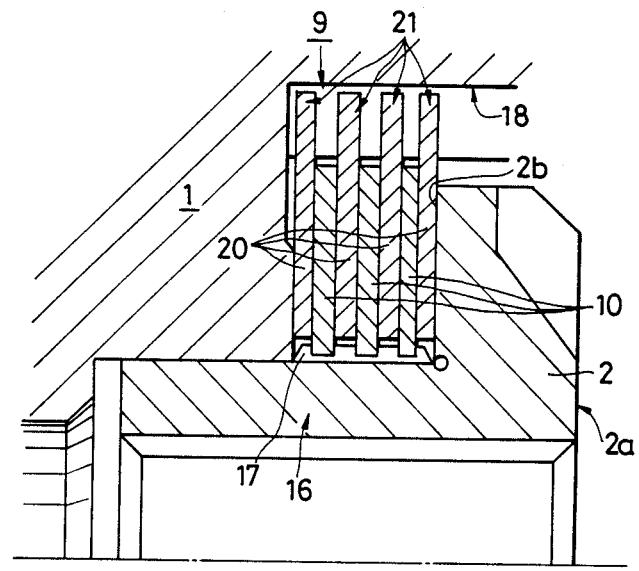
FIG. 5 is an enlarged fragmentary sectional view of the locking differential in FIG. 4.
Figure 6:
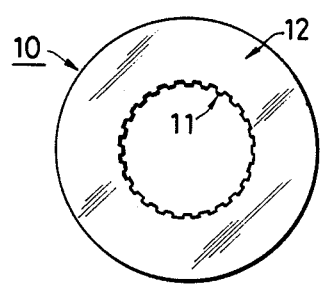
FIG. 6 is a plan view of a friction disk used in the pre-load type locking differential in FIG. 4.
Figure 7:
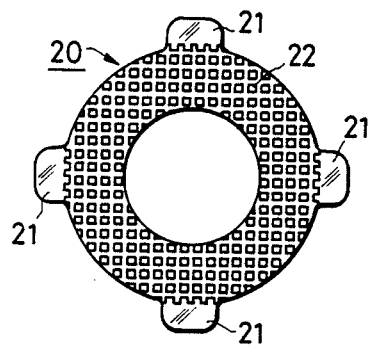
FIG. 7 is a plan view of a friction disk used in the pre-load type locking differential in FIG. 4.

With reference to FIGS. 1 through 3, there is illustrated a locking differential according to one embodiment of the present invention. The locking differential generally includes a differential case 30 to which pinion shafts 31, 31 are fixed in coaxially opposed relation. Pinion gears 32, 32 are rotatably mounted on the pinion shafts 31, 31, respectively. Axle shafts 33, 33 are rotatably journalled in the differential case 30, and extend at right angles to the pinion shafts 31, 31. Differential side gears 34, 34 are splined to the inner ends of the axle shafts 33, 33 for axial sliding movement therealong. The side gears 34, 34 mesh with the pinion gears 32, 32, and include bosses 35, 35. Sleeves 36, 36 are splined to the bosses 35, 35 of the side gears 34, 34 to slide along the axle shafts 33, 33, respectively. The sleeves 36, 36 have annular grooves 37, 37 with which forks 38, 38 are slidably engageable, each sleeve 36 being driven by a suitable actuator, for example, a diaphragm or push-pull cable (not shown). Also, each of the sleeves 36, 36 has external splines 39 on the outer periphery of the inner ends thereof.

The differential case 30 has on its inner periphery a plurality of slots 42 extending parallel to the sleeves 36, 36. Thrust washers 40 and guide rings 41 are alternately arranged on the inner periphery of the differential case 30, and include projections 43, 44, respectively. Engagement of the projections 43 of the thrust washers 40 with the slots 42 of the differential case 30 allows the thrust washers 40 to slide along the sleeves 36, 36. Similarly, engagement of the projections 44 of the guide rings 41 with the slots 42 of the differential case 30 allows the guide rings 41 to slide along the sleeves 36, 36. Interposed between adjacent thrust washers 40, 40 are clutch plates 45, inner splines of which are engageable with the external splines 39 of the sleeves 36, 36. The differential side gears 34, 34 are urged, through disks 47, 47, by a pressurizing spring 48. The thrust washers 40 are thus held in pressure contact with the clutch plate 45, both being pressed against end walls 49, 49 of the differential case 30. The pressurizing spring 48 employed herein provides a spring force of about 500 to 600 kg, while a force necessary to move the sleeves 36, 36 is about 50 to 60 kg. Accordingly, once a phase angle of each of the clutch plates 45 is established in such a manner to engage the splines 46 of the clutch plates 45 with the external splines 39 of the sleeves 36, 36, no angular displacement of the clutch plates occurs, and the sleeves 36, 36 can always be engaged with and disengaged from the clutch plates 45.

In operation, when the clutch plates 45 are not in engagement with the sleeve 36, as in the left-hand sleeve in FIG. 1, relative rotation of the thrust washers 40 and the clutch plates 45 does not take place. As a result, no friction torque is produced. The sleeve 36 is then moved to the right by a suitable actuator (not shown) so as to engage the clutch plates 45 for rotation therewith. Thus, friction torque is produced between the clutch plates 45 and the thrust washers 40. The greater the number of clutch plates engageable with the sleeves, the greater the friction torque producible between the clutch plates and the thrust washers. Maximum friction torque is achieved when the sleeve 36 is brought into all of the clutch plates 45, as in the right-hand sleeve in FIG. 1.

It will be noted that this invention is applicable to a center differential for full-time, four-wheel drive to vary the distribution of torque to front and rear ground wheels.

The present invention has the following advantages.

(1) The friction torque can readily and positively be adjusted by changing the number of the clutch plates engageable with the sleeves;

(2) The force necessary to slide the sleeves relative to the differential side gears is small and thus, the operation is simple; and (3) The locking differential of this invention is simple in structure and inexpensive to manufacture, as compared to a conventional locking differential with hydraulic means for hydraulically changing the force required to press the thrust washers an the clutch plates.

Although the invention has been described and illustrated in the accompanying drawings with respect to a single preferred embodiment, various modifications and changes may be made therein without departing from the spirit and scope of the invention, and thus the invention is not limited except by the terms of the appended claims.

What is claimed is:

1. A locking differential comprising:
a differential case, said differential case locating first and second axle shafts;
first and second side gears housed in said case to slide along said first and second axle shafts respectively;
a plurality of thrust washers and guide rings arranged in alternate relation in said case on each said axle shaft to slide along said axle shafts;
a plurality of clutch plates arranged in said guide rings and interposed between said thrust washers on each said axle shaft;
a resilient member urging said side gears to press said thrust washers and said clutch plates against inner surfaces of said case while said clutch plates are held in pressure contact with said thrust washers;
first and second sleeves arranged outwardly of said first and second side gears respectively and having external splines for slidable movement along said axle shafts;
each said clutch plate having on its inner periphery splines for selective engagement with said external splines of one of said sleeves; and
means for moving each said sleeve along the axis of its respective side gear for selectively progressively engaging said splines of said sleeve with said splines of such clutch plates.

2. A locking differential according to claim 1, wherein each said first and second sleeves has on one end an radial slot for engagement with a fork, said sleeves being slidable by an actuator engaged with said forks.

3. A locking differential according to claim 1, further comprising pinion shafts located in coaxially opposed relation.

4. A locking differential according to claim 3, wherein said first and second axle shafts are rotatably journalled in said differential case and extend at right angles to said pinion shafts.

5. A locking differential according to claim 1, wherein said first and second side gears are respectively splined to inner ends of said first and second axle shafts for axial sliding movement therealong.

6. A locking differential according to claim 5, wherein said first and second sleeves are respectively splined to bosses on said first and second side gears to slide along said axle shafts.

7. A locking differential according to claim 2, wherein said actuator is a diaphragm.

8. A locking differential according to claim 2, wherein said actuator is a push-pull cable.

9. A locking differential according to claim 1, wherein said differential case has on its inner periphery and plurality of slots, said slots being engageable with said thrust washers and said guide rings, thereby allowing said thrust washers and said guide rings to slide along said sleeves.

10. A locking differential according to claim 1, wherein said resilient member is a pressurizing spring.

11. A locking differential according to claim 10, wherein said pressurizing spring urges said first and second side gears through disks to hold said thrust washers in pressure contact with said clutch plates.

12. A locking differential according to claim 11, wherein said thrust washers and said clutch plates are held against end walls of said differential case.

13. A locking differential according to claim 1, wherein said resilient member provides a spring force of from 500 to 600 kg.

14. A locking differential according to claim 1, wherein a force necessary to move said sleeves is at least from 50 to 60 kg.

15. A locking differential comprising:

a differential case, said differential case locating first and second axle shafts;

first and second side gears housed in said case, said first and second side gears being respectively splined to inner ends of said first and second axle shafts for axial sliding movement therealong;

a plurality of thrust washers and guide rings arranged in alternate relation in said case on each said axle shaft to slide along said axle shafts;

a plurality of clutch plates arranged in said guide rings and interposed between said thrust washers on each said axle shaft;

a resilient member urging said side gears to press said thrust washers and said clutch plates against inner surfaces of said case while said clutch plates are held in pressure contact with said thrust washers;

first and second sleeves arranged outwardly of said first and second side gears respectively and having external splines, said first and second sleeves being respectively splined to bosses on said first and second side gears for slidable movement along said axle shafts;

each said clutch plate having on its inner periphery splines for engagement with said external splines of said sleeve; and means for moving said sleeves along the axis of said side gears.

* * * * *